United States Patent Office 3,770,733
Patented Nov. 6, 1973

3,770,733
NOVEL THERAPEUTICALLY ACTIVE DIHYDRO-BENZOTHIAZINE-S-DIOXIDES AND PROCESSES FOR PREPARING THEM
Enrico Sianesi, Milan, Paulo Da Re, Pisa, and Ivo Setnikar and Elena Massarani, Milan, Italy, assignors to Recordati SA Chemical and Pharmaceutical Company, Lugano, Switzerland
No Drawing. Filed Aug. 30, 1971, Ser. No. 176,254
Int. Cl. C07d 93/02
U.S. Cl. 260—243 R                                          4 Claims

ABSTRACT OF THE DISCLOSURE

New, therapeutically active compounds having the formula

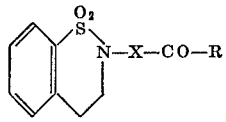

wherein X represents a straight or branched chain alkylene group having 1 to 3 carbon atoms, and R represents a group having the formula

wherein $R^1$ and $R^2$, which are the same or different, each represents hydrogen or a straight or branched chain alkyl, alkenyl or alkynyl group having up to 4 carbon atoms, or a phenyl group, or $R^1$ and $R^2$ together with the nitrogen atom to which they are bonded form a morpholino, piperidino, pyrrolidino or 4-methyl-piperizino group, or R represents a group having the formula

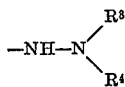

wherein $R^3$ and $R^4$, which are the same or different, each represents hydrogen or a lower alkyl group, or a phenyl group, or together form an alkylidene group having 2 or 3 carbon atoms, and processes for preparing the said compounds.

---

This invention relates to new derivatives of 3,4-dihydro-2H - 1,2 - benzothiazine-S-dioxide having the general formula:

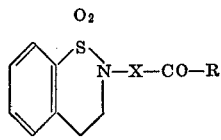

wherein X represents a straight or branched chain alkylene radical having 1 to 3 carbon atoms, and R represents a group having the formula:

wherein $R^1$ and $R^2$, which are the same or different, each represents hydrogen or a straight or branched chain alkyl, alkenyl or alkynyl group of up to 4 carbon atoms or a phenyl group, or $R^1$ and $R^2$ together with the nitrogen atom to which they are bonded, form a morpholino, piperidino, pyrrolidino or 4-methyl-piperizino group, or R represents a group having the formula:

wherein $R^3$ and $R^4$, which are the same or different, each represents hydrogen or a lower alkyl group or a phenyl group, or together form an alkylidene group having 2 or 3 carbon atoms.

N-isopropyl-(3,4-dihydro - 2H - 1,2-benzothiazin-2-yl) acetamide-S-dioxide may be mentioned as a particularly valuable product.

Compounds having Formula I possess activity on the central nervous system, particularly a sedative and hypnotic activity.

Compounds having Formula I are prepared, in accordance with the invention, by one of the following processes:

(1) The 3,4-dihydro - 2H - 1,2-benzothiazine-S-dioxide having the formula:

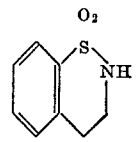

is condensed with a compound having the formula:

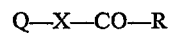

wherein X and R have the meanings given above, and Q represents a halogen atom or a sulfonic acid group. This condensation is carried out in the presence of an alkaline agent.

(2) A compound having the formula:

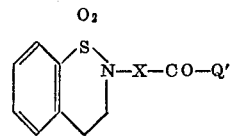

wherein X has the meaning given above and Q' represents a halogen atom, preferably chlorine, or a lower alkoxy radical, is condensed with a compound having the formula H—R, wherein R has the meaning given above.

(3) A compound having the formula

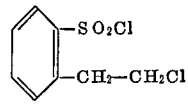

is cyclised by reacting it with a compound having the formula:

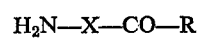

in the presence of an alkaline agent, wherein X and R have the meanings given above.

(4) For the preparation of compounds having Formula I wherein R represents a group having the formula:

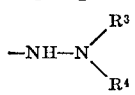

wherein $R^3$ and $R^4$ together form an alkylidene ($C_{2-3}$) group, a hydrazide having the formula:

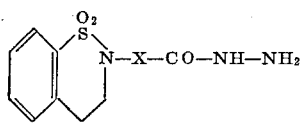

wherein X has the meaning given above, may be reacted with an aldehyde or a ketone having the formula $R^5=O$ wherein $R^5$ is an alkylidene ($C_{2-3}$) group. The desired hydrazone is formed and one molecule of water is eliminated. The hydrazone can be used for obtaining the corresponding $N^2$-monosubstituted hydrazide by saturating the double bond by catalytic hydrogenation, or by reduction with sodium borohydride in methanol solution.

3,4-dihydro-2H-1,2-benzothiazine-S-dioxide, which is a starting material for process 1 above, is a new compound which can be obtained by various ways illustrated in the following reaction diagram, and the subsequent examples.

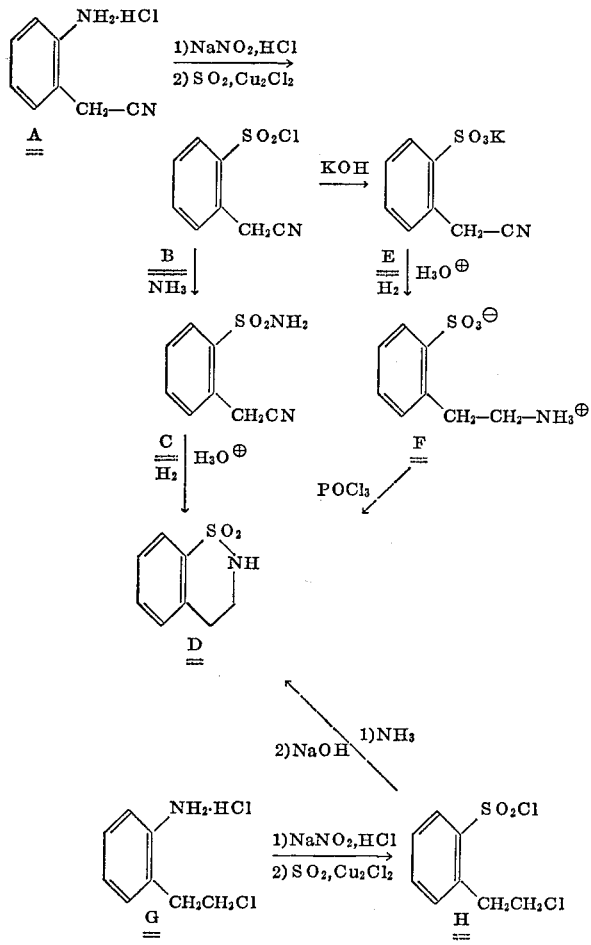

As is shown in the above diagram, the starting compound can be o-aminophenylacetonitrile hydrochloride (A), which is diazotized in a hydrochloric acid solution, then the diazonium derivative is treated with $SO_2$ in acetic solution in the presence of $Cu_2Cl_2$ as a catalyst, to obtain o-cyanomethylbenzenesulfonyl chloride (B), which is converted into o-cyanomethylbenzenesulfonamide (C) by the action of ammonia. By catalytically hydrogenating this intermediate in the presence of palladium on carbon in an acidic medium, the desired 3,4-dihydro-2H-1,2-benzothiazine-S-dioxide (D) is obtained.

As an alternative, o-cyanomethylbenzenesulfonyl chloride (B) is converted by hydrolysis with KOH into potassium o-cyanomethylbenzenesulfonate (E), which by catalytic reduction in the presence of palladium or carbon, yields 2-(2-aminoethyl)benzenesulfonic acid (F). The latter is cyclised in the presence of $POCl_3$ at an elevated temperature, with the removal of $H_2O$ to yield the desired 3,4-dihydro-2H-1,2-benzothiazine-S-dioxide (D).

It is also possible to obtain this starting material from 2-(2-chloroethyl)aniline hydrochloride (G). The latter, after diazotisation in a hydrochloric acid solution, followed by treatment with an acetic solution of $SO_2$ in the presence of $Cu_2Cl_2$ as a catalyst, yields 2-(2-chloroethyl)benzenesulfonyl chloride (H), which after being treated successively with ammonia and hot sodium hydroxide, is cyclised to yield the desired 3,4-dihydro-2H-1,2-benzothiazine-S-dioxide (D).

Intermediate compounds B, C, E, F, H are novel compounds.

To prepare the benzothiazine derivative used as a starting material in process 2 above, 3,4-dihydro-2H-1,2-benzothiazine-S-dioxide (D) is treated with an alkyl haloalkanoate in the presence of an alkaline agent to form the corresponding alkyl benzothiazin-N-alkanoate, which is saponified into an acid by treating it with NaOH. The free acid is converted into the chloride by treating it in $SOCl_2$ at an elevated temperature.

Examples 1 to 11 illustrate the preparation of starting materials for carrying out the processes according to the invention.

EXAMPLE 1 o-Cyanomethylbenzenesulfonyl chloride (B)

253 g. (1.5 mole) of o-aminophenylacetonitrile hydrochloride (prepared by salification of o-aminophenylacetonitrile Rousseau V. and Lindwall H. G.—J. Am. Chem. Soc. 72 (1950) 3047) is suspended in 1 liter of concentrated aqueous HCl, and is diazotized at 5–7° with 103.5 g. (1.5 mole) of sodium nitrite dissolved in 225 ml. of water. The solution is then filtered, and the ice-cold solution of diazo derivative is immediately poured portionwise into a mixture of 1500 ml. of acetic acid and approximately 180 g. of $SO_2$, while the mixture is stirred, and simultaneously a total of about 30 g. of $Cu_2Cl_2$ is added portionwise so as to initiate the reaction and keep it vigorous (a strong evolution of nitrogen and strong foaming take place). The mixture is stirred for another hour, it is diluted with water (the final volume of the suspension is about 5 liters), the yellow solid is collected, is washed with water, is pressed, and is dissolved in 3 liters of cold chloroform; the chloroform solution is washed to neutrality, is dried on $Na_2SO_4$, and at the same time is treated while cold with decolorizing carbon, it is filtered and said chloroform solution is used for preparing o-cyanomethylbenzenesulfonamide. When the solution is evaporated and the residue is taken up with a small amount of ligroin or 95% ethyl alcohol, the sulfochloride, which melts at 109–111° (benzene-ligroin) is obtained.

For: $C_8H_6ClNO_2S$.—Calculated (percent): C, 44.58; H, 3.16; N, 6.50; Cl, 16.44. Found (percent): C, 44.55; H, 2.85; N, 6.63; Cl, 16.24.

EXAMPLE 2 o-Cyanomethylbenzenesulfonamide (C)

The chloroform solution of sulfochloride (B) obtained from 253 g. (1.5 mole) of o-aminophenylacetonitrile hydrochloride is treated for 0.5 hour with a moderate stream of gaseous ammonia, the temperature being maintained between 20° and 30°; the solution is cooled in ice, and the solid is collected and washed with a little chloroform. The solid is rapidly dried in stream of warm air to remove the solvent, it is suspended in water to remove the ammonium chloride, and is dried in a stream of warm air. 157 g. of a product melting at 158–160° are obtained. After crystallizing in ethanol/water, and treating with decolorizing carbon, 141 g. of a product melting at 161–163° are obtained.

For: $C_8H_8N_2O_2S$.—Calculated (percent): C, 48.96; H, 4.10; N, 14.26; S, 16.33. Found (percent): C, 48.73; H, 4.31; N, 14.31; S, 16.54.

EXAMPLE 3

Potassium o-cyanomethylbenzenesulfonate (E)

23.94 g. (0.111 mole) of crystallized o-cyanomethylbenzenesulfonyl chloride (B) are dissolved in 1250 ml. of methanol, the solution is treated with 12.45 g. of potassium hydroxide dissolved in 65 ml. of methanol, and it is left standing at room temperature. The powdery potassium chloride is first separated; as soon as needle shaped crystals begin to settle on the walls of the vessel the mixture is filtered and left at 0°. 16.5 g. of product are separated; by evaporating the mother liquors to a small volume the second crop is obtained, which after separation and crystallization in 85% methanol (v./v.) yields another 5 g. of the product. This is crystallized in methanol/water, and after vacuum-drying over $P_2O_5$, a product melting above 300° is obtained.

For: $C_8H_6NO_3SK$.—Calculated (percent): C, 40.84; H, 2.57; N, 5.96; K, 16.62. Found (percent): C, 40.44; H, 2.71; N, 5.96; K, 16.24.

EXAMPLE 4

2(2-aminoethyl)benzenesulfonic acid (F)

The solution of 30.1 g. (0.128 mole) of potassium o-cyanomethylbenzenesulfonate (E) in 1800 ml. of methanol is treated with 100 ml. of concentrated hydrochloric acid; it is cooled in ice, and after filtering off the potassium chloride, the solution is treated with decolorizing carbon, filtered and hydrogenated at room temperature and atmospheric pressure over 5 g. of 10% palladium or carbon. It is then filtered, the catalyst is washed with hot water, the filtrates are evaporated and the residue is crystallized in aqueous alcohol. 18 g. of a product melting above 300° are obtained.

For: $C_8H_{11}O_3NS$.—Calculated (percent): C, 47.44; H, 5.19; N, 6.96; S, 15.93. Found (percent): C, 47.75; H, 5.51; N, 6.75; S, 15.81.

EXAMPLE 5

2(2-chloroethyl)benzenesulfonyl chloride (H)

34.5 g. (0.18 mole) of 2-(2-chloroethyl)aniline hydrochloride (Bennet G. M. and Hafez M. M.—J. Chem. Soc. 1941, 287) suspended in a mixture of 20 ml. of water, 20 ml. of glacial acetic acid and 40 ml. of concentrated hydrochloric acid are diazotised at 5° with a solution of 12.5 g. (0.18 mole) of sodium nitrite in 30 ml. of water. The ice cold solution is then treated with decolorizing carbon, it is filtered and poured in one batch, with stirring, into a mixture of 180 ml. of glacial acetic acid, 54 g. of $SO_2$, 11 g. of $CuCl_2$ and 200 ml. of benzene. It is warmed to 25° to initiate the reaction, which then continues exothermically, while the temperature rises to 40°; after 30 minutes, it is diluted with 300 ml. of water, the benzene phase is separated and the aqueous phase is extracted with benzene: the combined extracts are washed with water, with an aqueous solution of sodium bicarbonate, again with water, then they are dried and evaporated at reduced pressure. The residual brown oil is distilled (31 g.) under vacuum and the fraction boiling at 117–121°/0.4 mm. Hg is collected in the form of a yellowish oil which, after cooling, solidifies for the most part; the solid is pressed over a porous plate or a filter paper, it is treated with a little petroleum ether and collected: 11 g. of a substantially white solid product, are obtained. After crystallization in ligroin it melts at 43–45°.

For: $C_8H_8Cl_2O_2S$.—Calculated (percent): C, 39.88; H, 3.22; Cl, 29.67; S, 13.40. Found (percent): C, 40.18; H, 3.37; Cl, 29.36; S, 13.69.

EXAMPLE 6

3,4-dihydro-2H-1,2-benzothiazine-S-dioxide (D)

A suspension of 0.3 g. (1.25 mmole) of 2(2-chloroethyl)benzenesulfonyl chloride (H) in 3 ml. of concentrated ammonia is heated in a water bath: the material which at first was slurried, first melts, then solidifies once more; after adding 2 ml. of 5% (w./v.) sodium hydroxide, the mixture is heated for another 0.5 hour, it is then cooled and acidified with hydrochloric acid; a solid precipitates, which after being crystallized in water, yields 0.19 g. of a product melting at 156–157°.

Alternatively: 7.04 g. (0.035 mole) of 2(2-aminoethyl)benzenesulfonic acid (F) are treated with 70 ml. of $POCl_3$, and the mixture is boiled for 1.5 hours. After evaporation under vacuum the residue is treated with ice and approximately 20% w./v. NaOH; the hot alkaline solution is treated with decolorizing carbon, and is filtered and acidified with hydrochloric acid; 3.5 g. of product are obtained as platelets, which melts at 154.5–155.5°; after being crystallized in water it melts at 157–158°.

Alternatively: 110 g. (0.56 mole) of crystallized o-cyanomethylbenzene sulfonamide (C) are dissolved in 3.65 liters of methanol, the hot solution is treated with carbon, it is filtered, and 730 ml. of water, 73 ml. of concentrated hydrochloric acid, 15 g. of 10% palladium on carbon are added to the ice-cooled filtrate, and it is hydrogenated at room temperature and atmospheric pressure; the absorption takes place slowly and continues for approximately 8 hours. The mixture is filtered, concentrated to a small volume at reduced pressure, left standing in the cold; the precipitated product is collected and washed with water, and is dried in a stream of warm air; 82 g. of product melting at 154–158° are obtained.

For: $C_8H_9NO_2S$.—Calculated (percent): C, 52.43; H, 4.95; N, 7.64; S, 17.50. Found (percent): C, 52.55; H, 4.89; N, 7.90; S, 17.23.

EXAMPLE 7

(3.4-dihydro-2H-1.2-benzothiazin-2-yl)acetate of ethyle S-dioxide

To a solution of 1.49 g. of sodium in 100 ml. of absolute alcohol 11.85 g. (0.064 mole) of 3.4-dihydro-2H-1.2-benzothiazine-S-dioxide (D) dissolved in 125 ml. of absolute alcohol are added. The mixture is treated with 10.8 g. (0.064 mole) of ethyl bromoacetate and is refluxed for 60 minutes. The solvent is then evaporated and the residue is treated with 3% sodium hydroxide. It is extracted with ether and dried over anhydrous $Na_2SO_4$, the solvent is evaporated and the residue is distilled: 0.6 g. of product in the form of a very viscous pale yellow oil boiling at 215°/1 mm. Hg are obtained.

For: $C_{12}H_{15}NO_4S$.—Calculated (percent): C, 53.50; H, 5.61; N, 5.20. Found (percent): C, 53.77; H, 5.80; N, 5.35.

EXAMPLE 8

(3,4-dihydro-2H-1,2-benzothiazin-2-yl)acetic-S-dioxide acid

The crude ester obtained from 1.8 g. of 3,4-dihydro-2H-1,2-benzothiazine-S-dioxide, by a procedure similar to that described in the previous example, is dissolved in 5 ml. of methanol, then 0.35 ml. of potassium hydroxide dissolved in 5 ml. of methanol are added, and the solution is refluxed for 15 minutes. The solvent is then evaporated and the residue crystallized in 5 ml. of absolute alcohol: 1.8 g. of white product melting at 211–213° is obtained consisting of the potassium salt of (3,4-dihydro-2H-1,2-benzothiazin-2-yl)acetic acid S-dioxide, from which, by acidification, the free acid is obtained, which melts 152–154° after crystallization in $H_2O$.

For: $C_{10}H_{10}NO_4SK$ (salt).—Calculated (percent): C, 42.90; H, 3.60; N, 5.01. Found (percent): C, 43.14; H, 3.65; N, 4.95.

For: $C_{10}H_{11}NO_4S$ (acid).—Calculated (percent): C, 49.78; H, 4.59; N, 5.80. Found (percent): C, 49.43; H, 4.53; N, 5.57.

EXAMPLE 9

(3,4-dihydro-2H-1,2-benzothiazin-2-yl)acetyl-S-dioxide chloride

To a slurry of 9.64 g. (0.040 mole) of (3,4-dihydro-2H-1,2-benzothiazin-2-yl)acetic acid S-dioxide in 45 ml. of anhydrous benzene, 3.25 ml. (0.044 mole) of $SOCl_2$ are added, and it is refluxed for 2 hours. The solvent and the excess of $SOCl_2$ are removed by evaporation at reduced pressure, and the solid residue is crystallized in benzene, with decolorizing carbon. 9.9 g. of a crystalline white product melting at 108–110° are obtained.

For: $C_{10}H_{10}ClNO_3S$.—Calculated (percent): C, 46.24; H, 3.88; N, 5.39; Cl, 13.65; S, 12.34. Found (percent): C, 46.42; H, 4.07; N, 5.31; Cl, 13.85; S, 12.42.

EXAMPLE 10

Ethyl-S-dioxide 2-(3.4-dihydro-2H-1.2-benzothiazin-2-yl)butyrate

To a solution obtained from 1.15 g. of sodium metal (0.05 atom-grams) in 20 ml. of absolute alcohol, the hot solution of 9.16 g. (0.05 mole) of 3.4-dihydro-2H-1.2-benzothiazin-S-dioxide in 80 ml. of absolute alcohol is added. The mixture is stirred for 10 minutes, 8 ml. (approximately 0.055 mole) of ethyl α-bromobutyrate are added, and it is refluxed for 4 hours.

The solvent is evaporated at reduced pressure, the residue is treated with chloroform and 2% sodium hydroxide in water, the chloroform phase is separated and washed once with 2% sodium hydroxide, then with water to neutrality, and finally it is dried over anhydrous $CaCl_2$. After evaporating the solvent, an oily residue is obtained, which after distillation yields 6.95 g. of a product boiling at 160–163°/0.4 mm. Hg in the form of a clear pale yellow liquid.

For: $C_{14}H_{19}NO_4S$.—Calculated (percent): C, 56.44; H, 6.44; N, 4.71; S, 10.78. Found (percent): C, 56.63; H, 6.42; N, 4.79; S, 11.01.

EXAMPLE 11

2-(3,4-dihydro-2H-1,2-benzothiazin-2-yl)-butyric-S-dioxide acid 10.4 g. (0.035 mole) of ethyl 2-(3,4-dihydro-2H-1,2-benzothiazin-2-yl)butyrate S-dioxide are refluxed for 4 hours with 100 ml. of an aqueous solution of NaOH N; it is treated with decolorizing carbon and it is filtered by collecting the filtrate dropwise into an excess of hydrochloric acid. The desired acid precipitates, and after leaving it for one night in the cold, it is filtered off with a suction-pump; it is washed with water and crystallized in aqueous ethanol. 7.5 g. of a crystalline white product melting at 119–120° are obtained.

For: $C_{12}H_{15}NO_4S$.—Calculated (percent): C, 53.51; H, 5.61; N, 5.20; S, 11.90. Found (percent): C, 53.76; H, 5.72; N, 5.23; S, 11.95.

The following examples illustrate the process of the invention.

EXAMPLE 12

(3,4-dihydro-2H-1,2-benzothiazin-2-yl)acetamide-S-dioxide 7.15 g. of ethyl(3,4-dihydro-2H-1,2-benzothiazin-2-yl)acetate S-dioxide are dissolved in 50 ml. of methanol saturated with ammonia, and the mixture is left at room temperature for 4 hours, with occasional stirring. It is then diluted with 80 ml. of methanol, it is refluxed for a few minutes, decolorized with carbon, and filtered. 4.7 g. of a white product melting at 171–173° crystallize on cooling.

The mother liquors are concentrated to 30 ml., and another 0.6 g. of product having the same characteristic as the previous one are obtained.

For: $C_{10}H_{12}N_2O_3S$.—Calculated (percent): C, 49.98; H, 5.03; N, 11.66. Found (percent): C, 50.06; H, 5.02; N, 11.63.

EXAMPLE 13

N-ethyl-(3,4-dihydro-2H-1,2-benzothiazin-2-yl)acetamide-S-dioxide 0.54 g.=0.78 ml. (0.012 mole) of monoethylamine are added to 1.07 g. (0.004 mole) of ethyl(3,4-dihydro-2H-1,2-benzothiazin-2-yl)acetate S-dioxide dissolved in 10 ml. of ethanol. The mixture is left in a closed vessel at room temperature for 48 hours, with occasional stirring. It is boiled for a short time, and the solvent is evaporated at reduced pressure: the oily residue solidifies. It is suspended in ether and the solid is collected with a suction-pump. 0.8 g. of a product melting at 103.5–105.5° are obtained by crystallization in isopropanol with decolorizing carbon.

For: $C_{12}H_{16}N_2O_3S$.—Calculated (percent): C, 53.70; H, 6.01; N, 10.44; S, 11.95. Found (percent): C, 53.83; H, 6.01; N, 10.35; S, 12.19.

EXAMPLE 14

N-isopropyl(3,4-dihydro-2H-1,2-benzothiazin-2-yl)acetamide S-dioxide

To the solution of sodium methoxide obtained from 4.7 g. (0.204 gram-atom) of sodium metal in 200 ml. of methanol, 36.64 g. (0.2 mole) of 3,4-dihydro-2H-1,2-benzothiazin-S-dioxide are added at room temperature and the mixture is boiled and stirred for about 10 minutes. After cooling to room temperature, 27.86 g. (0.204 mole) of N-isopropyl-α-chloracetamide are added, and the mixture is boiled again for three hours with stirring. Then the methanol is almost completely distilled and the residue is taken up with 200 ml. of methylene chloride; the organic solution is washed four times each 100 ml. of 0.5 N NaOH, and twice with water, it is dried over anhydrous $Na_2SO_4$ and evaporated. The residue is crystallized in benzene-hexane and 44 g. of a product melting at 117–119° are obtained.

For: $C_{13}H_{18}N_2O_3S$.—Calculated (percent): C, 53.30; H, 6.42; N, 9.92; S, 11.36. Found (percent): C, 55.25; H, 6.44; N, 9.77; S, 11.53.

EXAMPLE 15

2-(3,4-dihydro-2H-1,2-benzothiazin-2-yl)butyramide-S-dioxide 2 ml. of $SOCl_2$ are added to 6.46 g. (0.024 mole) of 2-(3,4-dihydro-2H-1,2-benzothiazin-2-yl)butyric acid S-dioxide suspended in 35 ml. of anhydrous benzene; the slurry is refluxed for 1.5 hours, it is decolorized with carbon, evaporated repeatedly with benzene to remove the excess of $SOCl_2$, and finally the residue is dissolved in 50 ml. of anhydrous benzene. This solution is poured slowly, dropwise, with stirring, into 50 ml. of benzene through which gaseous ammonia is bubbled; the ammonia is bubbled for another hour, the solution is left for several hours, the precipitate is collected with a suction-pump and it is dried. 4.54 g. of a white crystalline product are obtained after crystallization in aqueous methanol; it melts at 117–119°.

For: $C_{12}H_{16}N_2O_3S$.—Calculated (percent): C, 53.70; H, 6.01; N, 10.44; S, 11.95. Found (percent): C, 53.79; H, 6.10; N, 10.37; S, 12.05.

EXAMPLE 16

(3,4-dihydro-2H-1,2-benzothiazin-2-yl)acethydrazide-S-dioxide

To 7.9 g. (0.29 mole) of ethyl (3,4-dihydro-2H-1,2-benzothiazin-2-yl) acetate S-dioxide dissolved in 40 ml. of methanol, 3.2 g. (3.5 ml.) of 98% hydrazine hydrate are added, and the mixture is refluxed for 4 hours. When the reaction is complete, the mixture is decolorized, filtered and placed in the refrigerator; 6.3 g. of product melting at 142–144° crystallize.

For: $C_{10}H_{13}N_3O_3S$.—Calculated (percent): C, 47.04; H, 5.13; N, 16.46. Found (percent): C, 47.22; H, 5.37; N, 16.19.

EXAMPLE 17

N'-methyl-N'-phenyl-(3,4-dihydro-2H-1,2-benzothiazin-2-yl)acethydrazide S-dioxide To 5.95 ml. (0.045 mole) of N-methyl-N-phenylhydrazine in 30 ml. of anhydrous benzene, 5.84 g. (0.0225 mole) of (3,4-dihydro-2H-1,2-benzothiazin - 2 - yl)acetyl chloride S-dioxide dissolved in 90 ml. of anhydrous benzene are slowly added dropwise at room temperature. The mixture is stirred at room temperature for 8 hours, the solvent is evaporated at reduced pressure, the residue is treated with chloroform and a 2% NaOH aqueous solution, the organic phase is separated, it is washed with water, dried over anhydrous $CaCl_2$, decolorized with carbon, and the solvent is removed; an oily residue remains, which solidifies after treatment with a little ether. The solid is collected by a suction-pump, it is crystallized in aqueous ethanol to yield 5.83 g. of a crystalline white product melting at 121–123°.

For: $C_{17}H_{19}N_3O_3S$.—Calculated (percent): C, 59.10; H, 5.54; N, 12.16; S, 9.28. Found (percent): C, 59.25; H, 5.70; N, 11.93; S, 9.57.

EXAMPLE 18

N'-ethylidene-(3,4-dihydro-2H-1,2-benzothiazin-2-yl)acethydrazide S-dioxide

To 8.93 g. (0.035 mole) of (3,4-dihydro-2H-1,2-benzothiazin-2-yl)-acethydrazide S-dioxide dissolved in 170 ml. of methanol, 2.36 ml. (0.042 mole) of acetaldehyde are added, and the mixture is left in a closed vessel to stand overnight. A bulky precipitate is obtained which is collected with a suction-pump, and is crystallized in absolute alcohol to yield 6.74 g. of a crystalline white product melting at 163–165°.

For: $C_{12}H_{15}N_3O_3S$.—Calculated (percent): C, 51.22; H, 5.37; N, 14.93; S, 11.39. Found (percent): C, 51.06; H, 5.47; N, 14.68; S, 11.13.

EXAMPLE 19

N'-ethyl-(3,4-dihydro-2H-1,2-benzothiazin-2-yl)acethydrazide S-dioxide.HCl

To 8.44 g. (0.030 mole) of N'-ethylidene-(3,4-dihydro-2H-1,2-benzothiazin-2-yl)acethydrazide S-dioxide suspended in 150 ml. of anhydrous methanol, 1.25 g. (0.033 mole) of $NaBH_4$ are added in small portions, with stirring and cooling. A solution is obtained which is stirred for one hour at room temperature, and refluxed for 15 minutes. The solvent is evaporated and the residue is treated with 10% aqueous NaOH, the oily base is extracted with chloroform, the extract is dried over anhydrous $K_2CO_3$, it is treated with decolorizing carbon, it is filtered and acidified with hydrogen chloride-alcohol: the hydrazide hydrochloride precipitates.

After leaving it overnight in the cold, the precipitate is collected with a suction-pump, it is dried and crystallized in alcohol-ether. 5.56 g. of a crystalline white product melting at 178–180° C. are obtained.

For: $C_{12}H_{17}N_3O_3S.HCl$.—Calculated (percent): C, 45.08; H, 5.67; N, 13.14; Cl, 11.08; S, 10.02. Found (percent): C, 45.47; H, 5.79; N, 12.76; Cl, 11.32; S, 9.90.

EXAMPLE 20

N,N-dimethyl-(3.4-dihydro-2H-1.2-benzothiazin-2-yl)acetamide S-dioxide

To a solution of 7.33 g. (0.040 mole) of 3.4-dihydro-2H-1.2-benzothiazine S-dioxide in 120 ml. of absolute ethanol, are added 1.01 g. (0.44 gram-atoms) of sodium metal dissolved in 40 ml. of absolute alcohol (the salt precipitates), 5.32 g. (0.44 mole) of N,N-dimethyl-α-chloroacetamide in 20 ml. of absolute alcohol and a small amount of potassium iodide. The mixture is refluxed for 7 hours and the solvent is evaporated on the steam-bath at reduced pressure. The oily residue is treated with 250 ml. of $CHCl_3$ and 50 ml. of 4% NaOH, the organic phase is separated and washed with another 50 ml. of 4% NaOH, then with water, and it is then dried over anhydrous $K_2CO_3$. It is decolorized with carbon, filtered, and the solvent is evaporated, and an oily residue is thus obtained, which solidifies on standing. 7.37 g. of a crystalline white product melting at 100–102° are obtained after crystallization in a mixture of water and alcohol.

For: $C_{12}H_{16}N_2O_3S$.—Calculated (percent): C, 53.70; H, 6.01; N, 10.45. Found (percent): C, 53.57; H, 6.17; N, 10.50.

In Table I the melting points and analytical data of similar products prepared by the above processes are given.

TABLE I

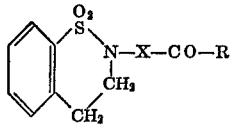

| | | | | | | Analysis, percent | | | | | | | |
|---|---|---|---|---|---|---|---|---|---|---|---|---|---|
| | | | | | | Calculated | | | | Found | | | |
| X | R | Crystallizing solvent | M.P., degree | Formula | | C | H | N | S | C | H | N | S |
| —$CH_2$— | —$NHCH_3$ | I | 143–145 | $C_{11}H_{14}N_2O_3S$ | | 51.95 | 5.54 | 11.02 | 12.60 | 51.57 | 5.64 | 10.98 | 12.75 |
| —$CH_2$— | —NH—$C_3H_7$-n | H-B | 59–62 | $C_{13}H_{18}N_2O_3S$ | | 55.29 | 6.42 | 9.92 | 11.35 | 55.57 | 6.25 | 9.95 | 11.38 |
| —$CH_2$— | —NH—$C_4H_9$(tert) | H-B | 98–100 | $C_{14}H_{20}N_2O_3S$ | | 56.73 | 6.80 | 9.45 | 10.81 | 57.04 | 6.66 | 9.33 | 10.97 |
| —$CH_2$— | —NH—$C_4H_9$-n | H-B | 70–72 | $C_{14}H_{20}N_2O_3S$ | | 56.73 | 6.80 | 9.45 | 10.81 | 56.64 | 6.66 | 9.33 | 10.76 |
| —$CH_2$— | —NH—CH—$C_2H_5$<br>\|<br>$CH_3$ | H-B | 105–107 | $C_{14}H_{20}N_2O_3S$ | | 56.73 | 6.80 | 9.45 | 10.81 | 56.90 | 6.82 | 9.29 | 10.76 |
| —$CH_2$— | —NH—$CH_2$—CH=$CH_2$ | H-B | 64–66 | $C_{13}H_{16}N_2O_3S$ | | 55.68 | 5.75 | 9.99 | 11.43 | 55.70 | 6.03 | 9.99 | 11.26 |
| —$CH_2$— | —NH—$CH_2$—C≡CH | H-B | 101–103 | $C_{13}H_{14}N_2O_3S$ | | 56.10 | 5.07 | 10.06 | 11.52 | 56.30 | 4.97 | 10.08 | 11.76 |
| —$CH_2$— | —N($C_2H_5$)$_2$ | H-B | 57–59 | $C_{14}H_{20}N_2O_3S$ | | 56.73 | 6.80 | 9.45 | 10.81 | 56.62 | 6.65 | 9.24 | 11.12 |
| —$CH_2$— | —N(iso-$C_3H_7$)$_2$ | I | 119–121 | $C_{16}H_{24}N_2O_3S$ | | 59.22 | 7.45 | 8.63 | 9.57 | 58.94 | 7.53 | 8.59 | 9.77 |

TABLE I—Continued

| X | R | Crystallizing solvent | M.P., degree | Formula | Calculated C | H | N | S | Found C | H | N | S |
|---|---|---|---|---|---|---|---|---|---|---|---|---|
| —CH₂— | —N(CH₂—CH₂)₂O (morpholino) | H-B | 90-92 | C₁₄H₁₈N₂O₄S | 54.17 | 5.84 | 9.02 | 10.33 | 54.25 | 6.08 | 9.05 | 10.56 |
| —CH₂— | —N(CH₂—CH₂)₂CH₂ (piperidino) | H-B | 106-108 | C₁₅H₂₀N₂O₃S | 58.41 | 6.53 | 9.08 | 10.39 | 58.22 | 6.64 | 9.05 | 10.73 |
| —CH₂— | —N(CH₂—CH₂)₂ (pyrrolidino) | H-B | 132-133 | C₁₄H₁₈N₂O₃S | 57.11 | 6.16 | 9.51 | 10.89 | 56.99 | 6.29 | 9.44 | 10.66 |
| —CH₂— | —N(CH₂—CH₂)₂N—CH₃ | H-B | 104-106 | C₁₅H₂₁N₃O₃S | 55.70 | 6.54 | 12.99 | 9.91 | 55.86 | 6.50 | 13.01 | 10.09 |
| —CH₂—CH₂— | —NH—C₃H₇-iso | H-B | 91-93 | C₁₄H₂₀N₂O₃S | 56.73 | 6.80 | 9.45 | 10.82 | 56.73 | 7.01 | 9.18 | 10.91 |
| —C(CH₃)₂— (CH₃ side) | —NH₂ | A-W | 145-147 | C₁₂H₁₆N₂O₃S | 53.70 | 6.01 | 10.44 | 11.95 | 53.71 | 5.84 | 10.21 | 12.04 |
| Same as above | —NHCH₃ | H-B | 91.5-93.5 | C₁₃H₁₈N₂O₃S | 55.29 | 6.42 | 9.92 | 11.35 | 55.15 | 6.62 | 9.76 | 11.44 |
| Do | —NH—C₃H₇-iso | H-B | 107-110 | C₁₅H₂₂N₂O₃S | 57.71 | 7.14 | 9.02 | 10.33 | 58.06 | 7.27 | 8.93 | 10.03 |
| Do | —N(CH₃)₂ | H-B | 98-100 | C₁₄H₂₀N₂O₃S | 56.73 | 6.80 | 9.45 | 10.81 | 56.76 | 6.75 | 9.34 | 10.74 |
| —CH₂— | —NH—N(CH₃)₂ | I | 136-138 | C₁₂H₁₇N₃O₃S | 50.86 | 6.04 | 14.83 | 11.31 | 50.71 | 5.81 | 14.75 | 11.12 |

NOTE.—I=isopropanol; H=hexane; B=benzene; A=ethanol; W=water.

The pharmacological results are given in Table II.

The substances were administered intraperitoneally to NMRI white mice. The 50% lethal doses (LD₅₀) were determined 48 hours after the administration of the substances. For the 50% hypnotic doses (HD₅₀), hypnosis was considered to coincide with the disappearance of the straightening reflex. For determining the anticonvulsive activity (AcD₅₀), the animals were subjected to an electric shock 30 minutes after administering the products.

The anticonvulsive dose is the dose which protects 50% of the animals.

All the doses are indicated in mg./kg. of body weight.

TABLE II

| X | R | LD₅₀ | HD₅₀ | AcD₅₀ |
|---|---|---|---|---|
| CH₂ | NH₂ | 1,000 | | 50 |
| CH₂ | NH—CH₃ | 1,150 | | 230 |
| CH₂ | NH—C₂H₅ | 870 | 240 | |
| CH₂ | NH—C₃H₇ | 560 | 122 | 28 |
| CH₂ | NH—C₃H₇-iso | 680 | 100 | |
| CH₂ | NH—C₄H₉ | 420 | 195 | |
| CH₂ | NH—C₄H₉-iso | 300 | 100 | |
| CH₂ | NH—CH₂—CH=CH₂ | 420 | 240 | 50 |
| CH₂—CH₂ | NH—C₃H₇-iso | 650 | 255 | |
| CH₂ | N(C₂H₅)₂ | 490 | 420 | |
| CH₂ | N(C₃H₇-iso)₂ | 875 | 300 | 87 |
| CH₂ | 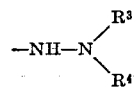 (pyrrolidino) | 1,000 | 750 | |
| CH₃—C(CH₃)— | NH₂ | 1,800 | | 300 |
| CH₃—C(CH₃)— | NH—CH₃ | 650 | 560 | |
| CH₃—C(CH₃)— | NH—C₃H₇-iso | 650 | 240 | 65 |
| CH₂ | NH—NH₂ | 750 | | 150 |
| CH₂ | NH—NHC₂H₅ | 650 | | 133 |
| CH₂ | NH—N=CH—CH₃ | 650 | | 130 |

We claim:

1. A compound of the formula:

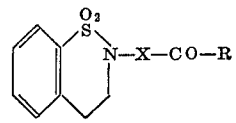

wherein X represents a straight or branched chain alkylene group having 1 to 3 carbon atoms, and R represents a group having the formula:

$$-N\begin{matrix}R^1\\R^2\end{matrix}$$

wherein $R^1$ and $R^2$, which are the same or different, each represents hydrogen or a straight or branched chain alkyl, alkenyl or alkynyl group having up to 4 carbon atoms, or a phenyl group, or $R^1$ and $R^2$ together with the nitrogen atom to which they are bonded form a morpholino, piperidino, pyrrolidino or 4-methyl-piperizino group, or R represents a group having the formula:

$$-NH-N\begin{matrix}R^3\\R^4\end{matrix}$$

wherein $R^3$ and $R^4$, which are the same or different, each represents hydrogen or a lower alkyl group or a phenyl group, or together form an alkylidene group having 2 or 3 carbon atoms.

2. N - isopropyl - (3,4 - dihydro-2H-1,2-benzothiazin-2-yl)-acetamide S-dioxide.

3. A process for preparing the compound of claim 1 in which R represents a group having the formula:

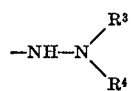

wherein $R^3$ and $R^4$ together form an alkylydene group having 2 or 3 carbon atoms, characterized in that a hydrazide having the formula:

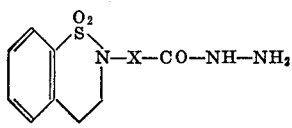

wherein X has the above given meaning is reacted with an aldehyde or a ketone having the formula $R^5=O$ wherein $R^5$ is an alkylydene group having 2 or 3 carbon atoms.

4. A process according to claim 3 characterized in that a hydrogen molecule is added to the compound thus obtained by catalytic hydrogenation or by reduction with sodium borohydride, to yield a compound of the formula:

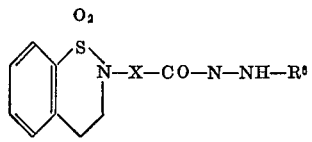

wherein $R^6$ is an alkyl group having 2 to 3 carbon atoms and X has the above given meaning.

References Cited

UNITED STATES PATENTS 3,041,336    6/1962    Teufel _____ 260—243
3,661,902    5/1972    Nakanishi et al. _____ 260—243

JOHN M. FORD, Primary Examiner

U.S. Cl. X.R.

424—246; 260—465 E, 465 R, 543 R

UNITED STATES PATENT OFFICE
CERTIFICATE OF CORRECTION

PATENT NO. : 3,770,733
DATED : NOVEMBER 6, 1973
INVENTOR(S) : ENRICO SIANESI et al

It is certified that error appears in the above-identified patent and that said Letters Patent are hereby corrected as shown below:

Column 1, line 34, change "4-methyl-piperizino" to --- 4-methyl-piperazino ---.

Column 2, line 4, change "4-methyl-piperizino" to --- 4-methyl-piperazino ---.

Column 12, line 62, change "4-methyl-piperizino" to --- 4-methyl-piperazino ---.

Column 5, line 40, change "or" to --- on ---.

Column 5, line 61, change "$CuCl_2$" to --- $Cu_2Cl_2$ ---.

Signed and sealed this 17th day of June 1975.

(SEAL)
Attest:

RUTH C. MASON
Attesting Officer

C. MARSHALL DANN
Commissioner of Patents
and Trademarks